(12) United States Patent
Mohammed et al.

(10) Patent No.: US 12,181,321 B2
(45) Date of Patent: Dec. 31, 2024

(54) DIESEL EXHAUST FLUID SENSOR ADAPTER FOR FLUID AERATION MITIGATION

(71) Applicant: SHAW DEVELOPMENT, LLC, Bonita Springs, FL (US)

(72) Inventors: Feroz Mohammed, Bonita Springs, FL (US); Steven Milette, Naples, FL (US)

(73) Assignee: SHAW DEVELOPMENT, LLC, Bonita Springs, FL (US)

( * ) Notice: Subject to any disclaimer, the term of this patent is extended or adjusted under 35 U.S.C. 154(b) by 0 days.

(21) Appl. No.: 18/691,074

(22) PCT Filed: Sep. 8, 2023

(86) PCT No.: PCT/US2023/032291
§ 371 (c)(1),
(2) Date: Mar. 12, 2024

(87) PCT Pub. No.: WO2024/054630
PCT Pub. Date: Mar. 14, 2024

(65) Prior Publication Data
US 2024/0271980 A1    Aug. 15, 2024

Related U.S. Application Data

(60) Provisional application No. 63/404,788, filed on Sep. 8, 2022.

(51) Int. Cl.
*G01F 15/08* (2006.01)
*G01D 5/42* (2006.01)
*G01D 11/12* (2006.01)

(52) U.S. Cl.
CPC .............. *G01F 15/08* (2013.01); *G01D 5/42* (2013.01); *G01D 11/12* (2013.01)

(58) Field of Classification Search
CPC ............ G01F 15/08; G01D 5/42; G01D 11/12
See application file for complete search history.

(56) References Cited

U.S. PATENT DOCUMENTS 1,366,382 A * 1/1921 Heath .................. G01N 7/04
                                                    422/92
2015/0337708 A1  11/2015 Schlenke et al.
(Continued)

OTHER PUBLICATIONS

Patent Cooperation Treaty (PCT), International Search Report and Written Opinion for Application PCT/US2023/032291 filed on Sep. 8, 2023, mailed Jan. 19, 2024, International Searching Authority, US.

*Primary Examiner* — Paul M. West
(74) *Attorney, Agent, or Firm* — McDonald Hopkins LLC

(57) ABSTRACT

Provided is a diesel exhaust fluid (DEF) sensor adapter. The sensor adapter may include two chambers. The first chamber may include a tortuous pathway for fluid and/or air flow. The second chamber may be fluidly sealed or separated from the first chamber and may house electrical components. The tortuous pathway may include varying stepped segments having a decreasing diameter from a proximal toward a distal end. For example, a first segment at the proximal end may have a larger diameter than a second, middle segment. An entrance to a third segment from the second segment may have a greatly reduced size. The tortuous pathway may further include a vent inlet positioned at approximately the same height as the entrance but requiring an approximate 180° turn therebetween. The inlet may extend into two opposite substantially horizontal portions that each lead to a vent outlet on opposite sides of the sensor adapter. The turn from the inlet to the substantially horizontal portions may be approximately 90°. The sensor adapter and tortuous pathway may mitigate aeration of DEF. The sensor adapter may prevent aerated DEF from entering the sensor adapter and (Continued)

may allow air to vent out of the sensor adapter to prevent aeration of DEF within the sensor adapter.

16 Claims, 10 Drawing Sheets

(56) References Cited

U.S. PATENT DOCUMENTS

| | | |
|---|---|---|
| 2019/0127679 A1 | 5/2019 | Shevitz |
| 2019/0209969 A1 | 7/2019 | Locke et al. |
| 2021/0239509 A1 | 8/2021 | Kuieck et al. |

* cited by examiner

DIESEL EXHAUST FLUID SENSOR ADAPTER FOR FLUID AERATION MITIGATION

CROSS-REFERENCE TO RELATED APPLICATION

The application is a 35 U.S.C. § 371 national stage application of PCT Application No. PCT/US2023/032291 filed on Sep. 8, 2023, which claims priority to U.S. Patent Application No. 63/404,788, filed on Sep. 8, 2022, entitled "DIESEL EXHAUST FLUID SENSOR ADAPTER FOR FLUID AERATION MITIGATION," each of which are incorporated herein by reference in their entireties.

FIELD OF THE DISCLOSURE

The disclosure relates to a diesel exhaust fluid sensor adapter and, more particularly, a diesel exhaust fluid sensor adapter for fluid aeration mitigation.

BACKGROUND OF THE DISCLOSURE

Diesel Exhaust Fluid (DEF) tanks have become standard on diesel powered ground vehicles since 2010 in the United States of America. DEF is a reduction agent and an Aqueous Urea Solution (AUS) that can be used in Selective Catalytic Reduction (SCR) diesel emissions systems. DEF has unique properties and is critical to the performance of emissions systems on diesel engine equipment equipped with SCR diesel emissions systems.

As such, it is typical to provide multiple sensors in the DEF reservoir. These sensors may monitor one or more of the fluid level, fluid temperature, fluid concentration (e.g., urea in water), etc. For example, a DEF fluid level sensor may measure the level of fluid remaining in the DEF tank. When the liquid level is low, the DEF level sensor can send a signal to the vehicle's electronic control unit, which then triggers the warning light on the gauges or panel of the vehicle. Multiple sensor strategies are used to discern the reservoir and fluid conditions.

Most, if not all, sensor technologies (e.g., ultrasonic, thermal dispersion, infrared spectrographic, etc.) are sensitive to air in the DEF. Entrained air (e.g., bubbles) can change the physical characteristics of DEF as well as the behavior of the sensor. For example, entrained air or bubbles embedded in the DEF can disperse the ultrasonic or other signal from the sensor and result in the sensor not receiving the echo reflection. Such entrained air or bubbles embedded in the DEF can cause erratic measurement results or result in no measurement results. Regardless of the parameter being measured (e.g., speed of sound, resistance/conductance, specific heat, dynamic viscosity, optical characteristic, etc.), air in the fluid will more than likely negatively impact the measurement or, at minimum, cause the sensor technologies and corresponding measurements to be unreliable and/or undependable. Entrained air can also be the cause of sensor errors, fault codes, and observed measurement fluctuations (e.g., in DEF level, DEF temperature, DEF/urea concentration, etc.) when the vehicle is in use. Entrained air can cause inaccurate measurement readings and/or measurement readings may be unavailable entirely. It is possible that No Fault Found (NFF) warranty claims may be attributed to the problem of entrained air affecting sensor measurement readings.

The air bubbles that impact sensor function can be generally categorized into two types. In a first example, volumes of trapped air in a confined space may create larger bubbles (approximately 0.002 ml or greater in size). These larger bubbles may have relatively high buoyancy and typically rise easily in the liquid. The second type of air bubbles are extremely small and referred to as "micro-bubbles" or "nano-bubbles." These "micro-bubbles" may have relatively low buoyancy and tend to attach to vertical and horizontal surfaces. For example, the buoyancy forces of these "micro-bubbles" are generally inadequate to overcome the surface adhesion to the vertical and horizontal surfaces so they instead stick to these surfaces. Accordingly, these "micro-bubbles" may adhere to sensor surfaces and sensor reflectors.

The larger bubbles are typically formed from trapped air in enclosed spaces that get filled with the DEF. This often occurs in sensors that utilize covers, shrouds, or other enclosures to provide a stable liquid environment for the sensor to operate (i.e., that minimize liquid slosh or movement). To prevent the trapped air, these enclosures may provide venting apertures at the highest points to allow the air to escape. Additionally, fill apertures may be provided at the lowest points to allow the liquid to enter the enclosure and displace the air. However, as these venting apertures must be large enough to allow air to escape as liquid enters the enclosure, they also provide a path for "micro-bubbles" to be driven into the enclosures. Once inside the enclosure the "micro-bubbles" can stick to critical surfaces such as the reflector or sensor faces. In an example, the sensor errors can be caused by air entering through the sensor vent apertures.

The smaller, "micro-bubbles," can be a result of extreme agitation or aeration of the DEF. Typical causes are aeration during DEF tank filling and sloshing of DEF fluid due to the dynamic environment and use of a vehicle. Another source is the standard filling nozzle for DEF, which utilizes a Venturi system to provide automatic shut-off of the nozzle when the DEF tank is full. This Venturi system actually ingests air from the tank and entrains the air in the DEF as it goes through the nozzle into the DEF tank. For the most part, the entrained air can eventually evolve out of the DEF and may not adversely impact on the system operation. However, some of the smaller ("micro-bubbles") affix themselves to the internal walls of the sensor enclosures and disrupt the sensor readings. Liquid agitation has been found to be inadequate to remove these bubbles. The most reliable way to remove "micro-bubbles" is to manually wipe the impacted surfaces and re-submerge the sensor. This is of course impractical for a sensor on an operating vehicle and since the undesirable air can form with normal use of the vehicle.

Given this, there is a need in the art for sensors, sensor assemblies, and/or sensor adapters that mitigate entrained air or aeration of DEF. There is a need for addressing either or both the cause and dispersion of larger bubbles trapped in DEF and/or "micro-bubbles." The provided adapters and assemblies may prevent air from accumulating on or near sensor surfaces or otherwise inhibiting sensor measurements and may provide a solution for breaking up or directing any air that may enter into the sensor assembly or adapter. The structures and designs may provide one or more (or all) of the following: accurate DEF sensor measurements, reliable sensor measurements, decreased entrained air in DEF, increased dispersal or mitigation of entrained air in DEF and reliable sensor measurements, reduced sensor error readings, decreased slosh issues coming from the sensor adapter (e.g., the upper adapter, etc.), balance of enhanced performance and cost of production, relative ease of production, and the like.

SUMMARY OF THE DISCLOSURE

The following presents a summary of this disclosure to provide a basic understanding of some aspects. This summary is intended to neither identify key or critical elements nor define any limitations of embodiments or claims. This summary may provide a simplified overview of some aspects that may be described in greater detail in other portions of this disclosure. Furthermore, any of the described aspects may be isolated or combined with other described aspects without limitation.

Provided is a diesel exhaust fluid (DEF) sensor adapter. The sensor adapter may include two chambers. The first chamber may include a tortuous pathway for fluid and/or air flow. The second chamber may be fluidly sealed or separated from the first chamber and may house electrical components. The tortuous pathway may include varying stepped segments having a decreasing diameter from a proximal toward a distal end. For example, a first segment at the proximal end may have a larger diameter than a second, middle segment. An entrance to a third segment from the second segment may have a greatly reduced size. The tortuous pathway may further include a vent inlet positioned at approximately the same height as the entrance but requiring an approximate 180° turn therebetween. The inlet may extend into two opposite substantially horizontal portions that each lead to a vent outlet on opposite sides of the sensor adapter. The turn from the inlet to the substantially horizontal portions may be approximately 90°. The sensor adapter and tortuous pathway may mitigate aeration of DEF. The sensor adapter may prevent aerated DEF from entering the sensor adapter and may allow air to vent out of the sensor adapter to prevent aeration of DEF within the sensor adapter.

Disclosed is a fluid sensor adapter for fluid aeration mitigation. In an embodiment, the fluid sensor adapter may comprise a first chamber comprising an inlet configured to receive diesel exhaust fluid. In an embodiment, the first chamber may include a first segment at a proximal end of the fluid sensor adapter, a third segment at a distal end of the sensor adapter and a second segment in between the first and the third segments. In an embodiment, a diameter of the second segment may be less than a diameter of the first segment. In an embodiment, an entrance to the third segment from the second segment may be more narrow than the diameter of the second segment. In an embodiment, the decrease in diameter from the first segment to the second segment and the narrowing of the entrance to the third segment from the second segment may comprise a tortuous vent pathway configured to prevent air in a fluid from reaching a sensor.

In an embodiment, the second segment and the third segment may have approximately the same diameter. In an embodiment, the first segment may include a shoulder that facilitates the decrease in diameter from the first segment to the second segment. In an embodiment, the second segment may include a shoulder that facilitates the narrowing of the entrance to the third segment from the second segment. In an embodiment, the entrance to the third segment from the second segment may further include a shelf that facilitates the narrowing of the entrance to the third segment from the second segment. In an embodiment, the decreases in diameter from the first segment to the second segment and the narrowing of the entrance to the third segment from the second segment may occur on an interior and an exterior of the fluid sensor adapter.

In an embodiment, the fluid sensor adapter may further include at least one vent in the third segment. In an embodiment, the fluid sensor adapter may further include at least two vents in the third segment. In an embodiment, the at least one vent may have a substantially horizontal portion. In an embodiment, the at least two vents may each have a substantially horizontal portion. In an embodiment, the first segment may include a seal. In an embodiment, the first segment may include an O-ring. In an embodiment, the third segment may include a seal. In an embodiment, the third segment may include a plug and O-ring. In an embodiment, the fluid sensor adapter may further include a second chamber. In an embodiment, the second chamber may be positioned adjacent the first chamber but be fluidly isolated from the first chamber.

Disclosed is a fluid sensor adapter for fluid aeration mitigation. In an embodiment, the fluid sensor adapter may include a first chamber. In an embodiment, the first chamber may include a first segment at a proximal end of the sensor adapter, a third segment at a distal end of the sensor adapter, and a second segment in between the first and the third segments. In an embodiment, the third segment may include at least one vent, an O-ring, and a plug. In an embodiment, the first segment may include an O-ring.

In an embodiment, the first segment may include a shoulder that facilitates a decrease in diameter from the first segment to the second segment. In an embodiment, the second segment may include a shoulder that facilitates a narrowing at an entrance to the third segment from the second segment. In an embodiment, the plug and the O-ring may be located at a top of the third segment. In an embodiment, the at least one vent may be located at a bottom of the third segment. In an embodiment, an entrance to the third segment from the second segment may be adjacent an inlet of the at least one vent. In an embodiment, the entrance and the inlet may be separated by a shelf. In an embodiment, fluid and/or air from the entrance to the inlet may requires a sharp turn. In an embodiment, fluid and/or air from the entrance to the inlet may requires a 180° turn. In an embodiment, the at least one vent may have a substantially horizontal portion. In an embodiment, the third segment may include two vents that each vent to opposite sides of the fluid sensor adapter. In an embodiment, each vent may have a substantially horizontal portion. In an embodiment, the third segment may include two vents that are spaced apart 180° from each other.

The following description and the drawings disclose various illustrative aspects. Some improvements and novel aspects may be expressly identified, while others may be apparent from the description and drawings.

BRIEF DESCRIPTION OF THE DRAWINGS

Operation of the present teachings may be better understood by reference to the detailed description taken in connection with the following illustrations. These appended drawings form part of this specification, and written information in the drawings should be treated as part of this disclosure. In the drawings.

Figure 1A:
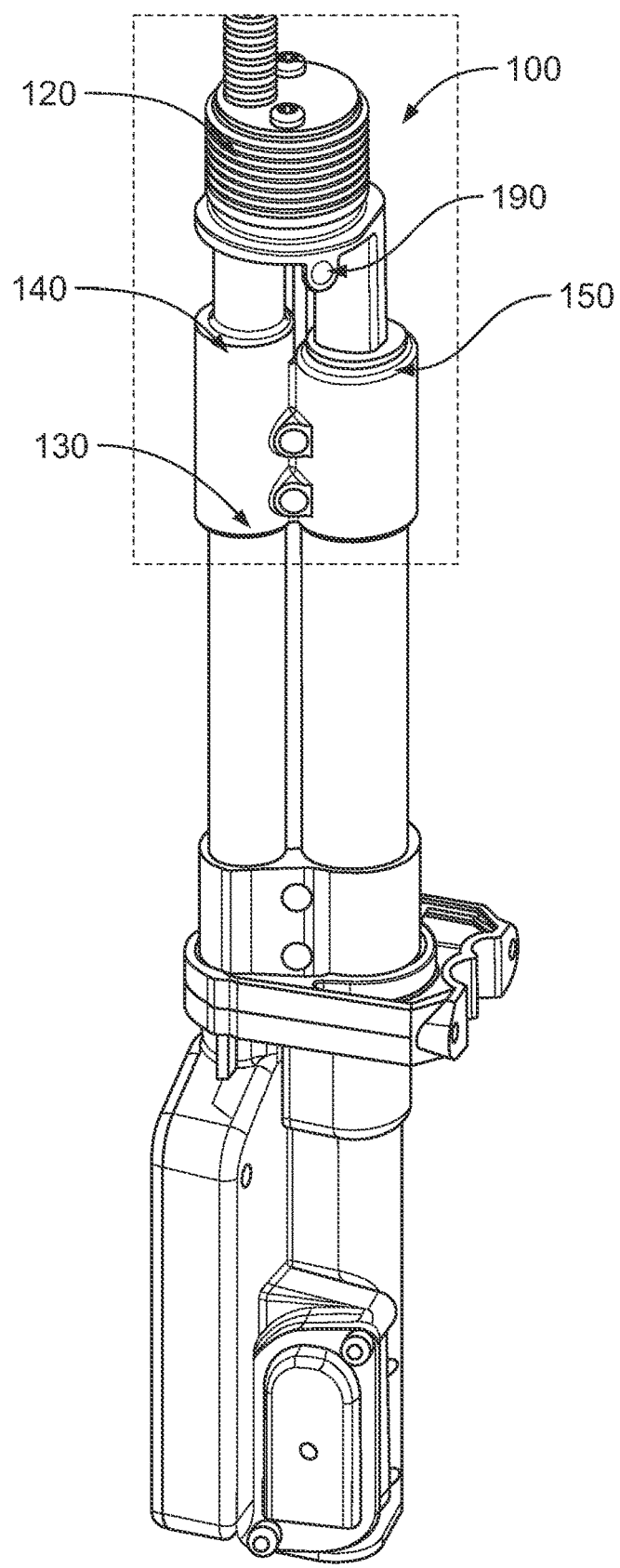
FIG. 1A shows a perspective view of an embodiment of a DEF sensor adapter in accordance with various aspects disclosed herein.
Figure 1B:
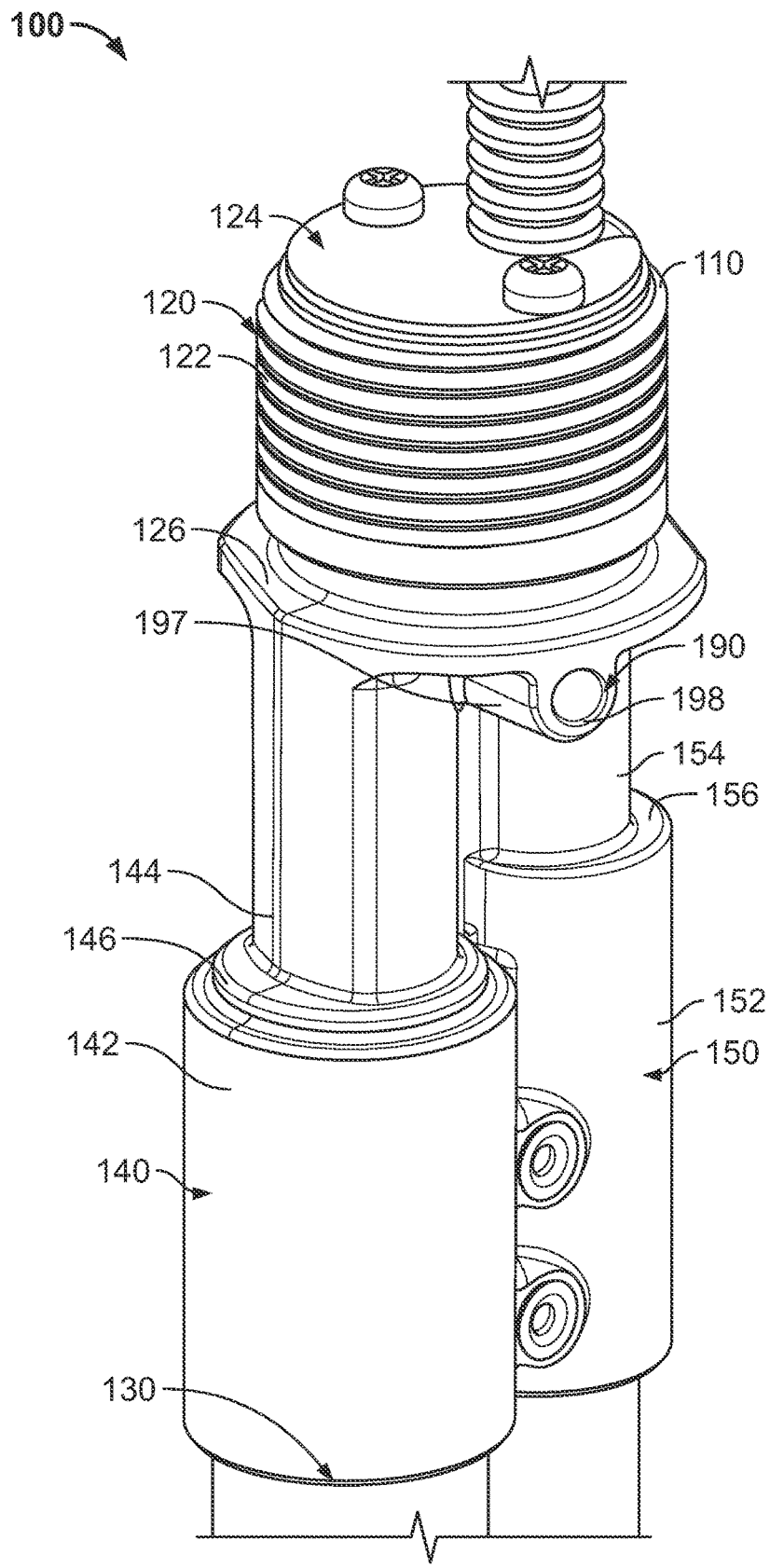
FIG. 1B shows a perspective view of an embodiment of a DEF sensor adapter in accordance with various aspects disclosed herein.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE DISCLOSURE

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Further, unless context suggest otherwise, descriptions of shapes (e.g., circular, rectangular, triangular, etc.) refer to shapes meeting the definition of such shapes and general representation of such shapes. For instance, a triangular shape or generally triangular shape may include a shape that has three sides and three vertices or a shape that generally represents a triangle, such as a shape having three major sides that may or may not have straight edges, triangular like shapes with rounded vertices, etc.

Turning to FIGS. 1-7, shown is are embodiments of sensor adapter 100 that may be used in DEF applications. It is noted that the sensor adapter 100 may also be used in other applications where a fluid is susceptible to entrained air or to otherwise mitigate fluid aeration. While the present disclosure discloses use in DEF applications such information can apply to these other applications will little to no modifications needed.

The sensor adapter 100 may be selectively coupled to a sensor (not shown) to provide a sensor assembly of any appropriate configuration. The sensor assembly may be installed in a DEF reservoir or tank (not shown) of any appropriate configuration. The sensor assembly (e.g., either the sensor adapter 100 or sensor) may include a controller housing and a controller. In an example, the controller may include a circuit board. A sensing element may be electrically coupled to the controller and may share a housing or have a separate sensing element housing. In an example, the controller, sensing element, or any other electrical component or connection as desired, may be potted in waterproof material.

The sensor adapter 100 may include a housing 110. The housing 110 may include an exterior surface 112 and interior surface 114, shown in FIG. 4A for example, wherein the interior may include one or more interior cavities, conduits, chambers, pathways, or hollow portions therein. The interior cavities, conduits, chambers, pathways, or hollow portions may each have one or more portions, segments, pathways, and the like. The sensor adapter 100 and housing 110, or a portion thereof, may be configured to selectively restrict and permit fluid, air, and/or fluid/air flow therein. For example, the sensor adapter 100 may include a tortuous pathway 193 through the chambers therein and into and out of the vents to separate and/or release any entrained air (if present) from the DEF and/or to prevent any air and entrained air/fluid from entering the body of the sensor adaptor 100 and affecting sensor readings. In some embodiments, the tortuous pathway 193 may comprise a path that does not have a straight path therethrough, i.e., it includes bends and turns so there is no clear line of site through the pathway. The configuration of the tortuous pathway 193 may include any form of bends and turns and is not limited to that shown in the drawings. The sensor adapter 100 and housing 110, or a portion thereof, may be configured to house electrical components or connections.

It is noted that the terms fluid and DEF as referred to herein may generally include fluid and DEF that has entrained air present as well as fluid and DEF that does not have entrained air present unless otherwise stated or context suggests otherwise (e.g., before and after the tortuous 193 pathway intended to separate entrained air or prevent fluid having air from entering into areas near the sensor). It is also noted that the terms DEF and fluid as referred to herein may generally be used interchangeably and that embodiments described herein may be used in non-diesel applications even if DEF may be described. It is noted that the terms fluidly connected and fluidly sealed as used herein may refer to both liquid and air connections and seals.

The sensor adapter 100 may include a first end 120 and a second end 130. It is noted that the first end 120 may also be referred to as a proximal end and the second end 130 may also be referred to as a distal end, or vice versa where the first end 120 is referred to as the distal and the second end 130 is referred to as the proximal end. It is noted that the first end 120 may also be referred to as a bottom end and the second end 130 may also be referred to as a top end.

Figure 4A:
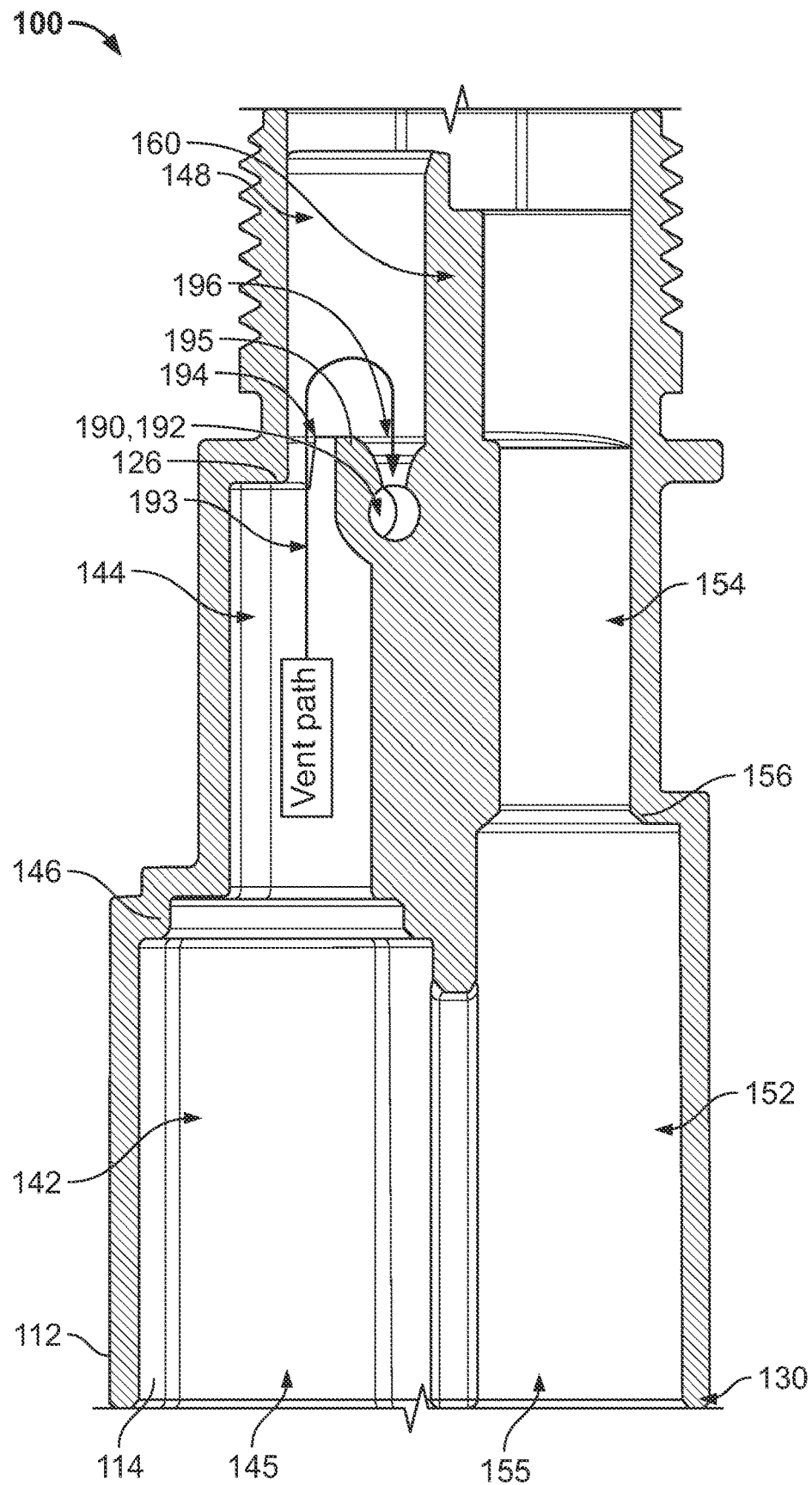
FIG. 4A shows a cross-sectional view of an embodiment of a DEF sensor adapter in accordance with various aspects disclosed herein.
Figure 4B:
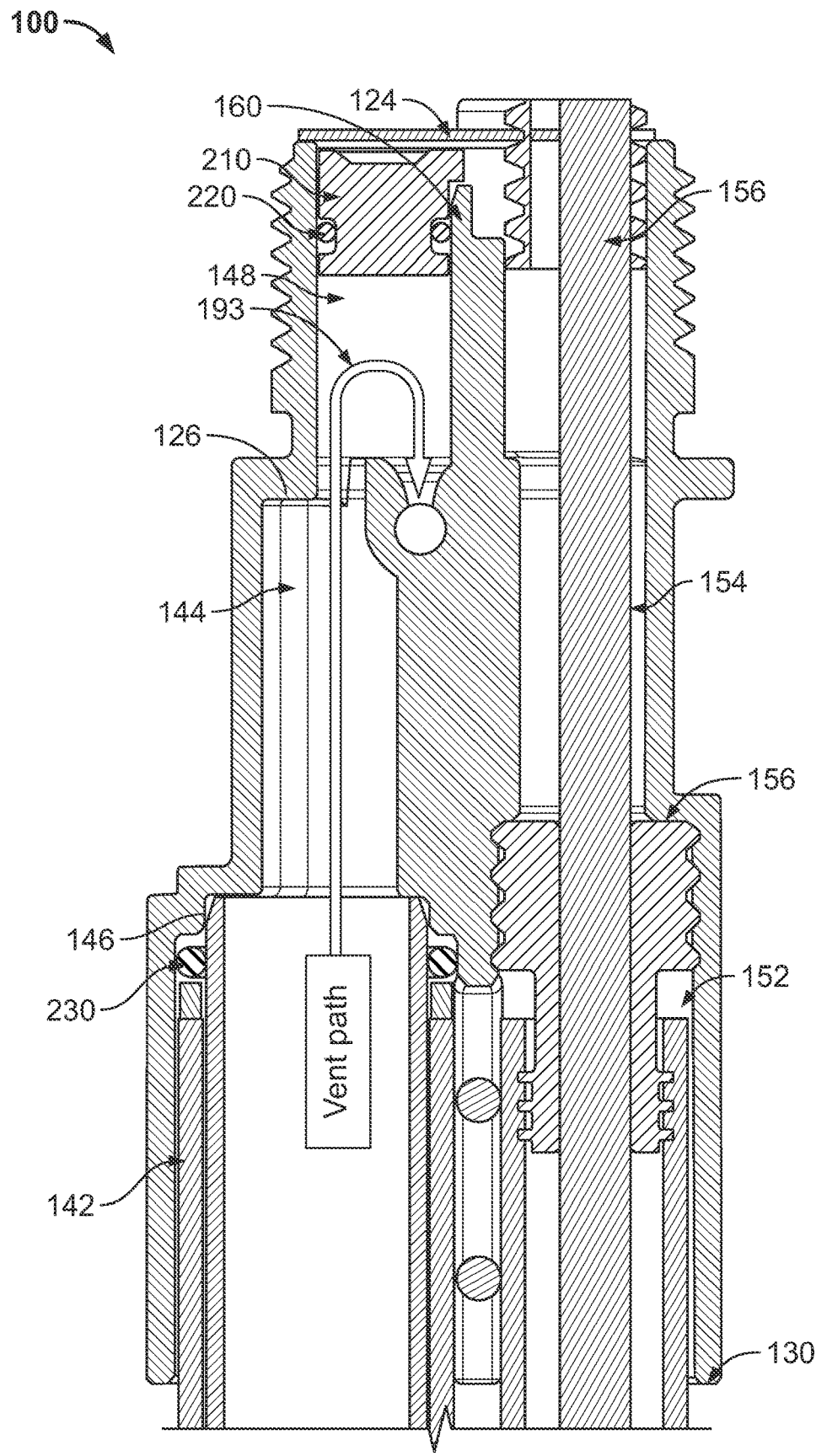
FIG. 4B shows a cross-sectional view of an embodiment of a DEF sensor adapter selectively attached to a mating component in accordance with various aspects disclosed herein.
Figure 5:
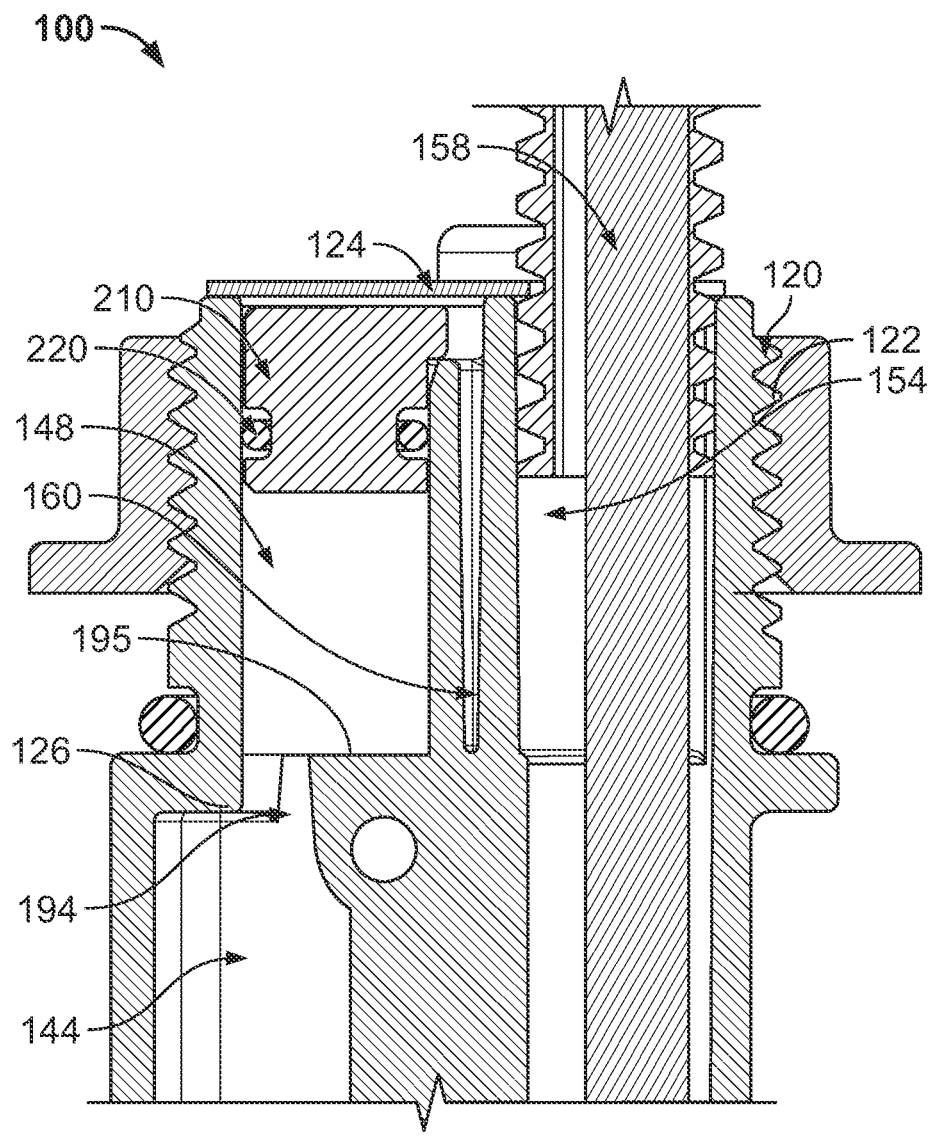
FIG. 5 shows a cross-sectional view of an embodiment of an upper portion of a DEF sensor adapter selectively attached to a mating component in accordance with various aspects disclosed herein.
Figure 6:
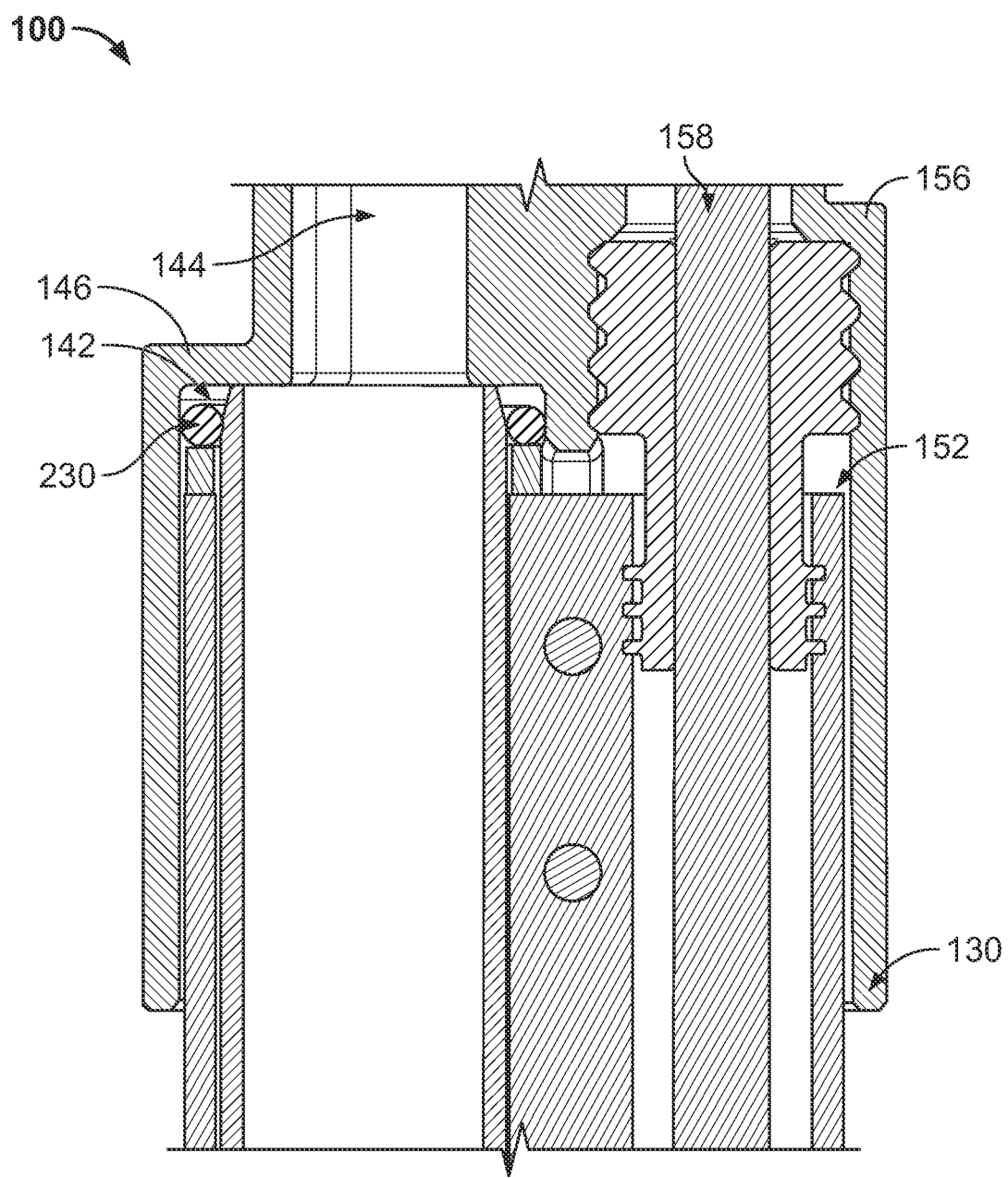
FIG. 6 shows a cross-sectional view of an embodiment of a lower portion of a DEF sensor adapter selectively attached to a mating component in accordance with various aspects disclosed herein; and, FIG. 7 shows a perspective view of an embodiment of a DEF sensor adapter in accordance with various aspects disclosed herein.
Figure 7:
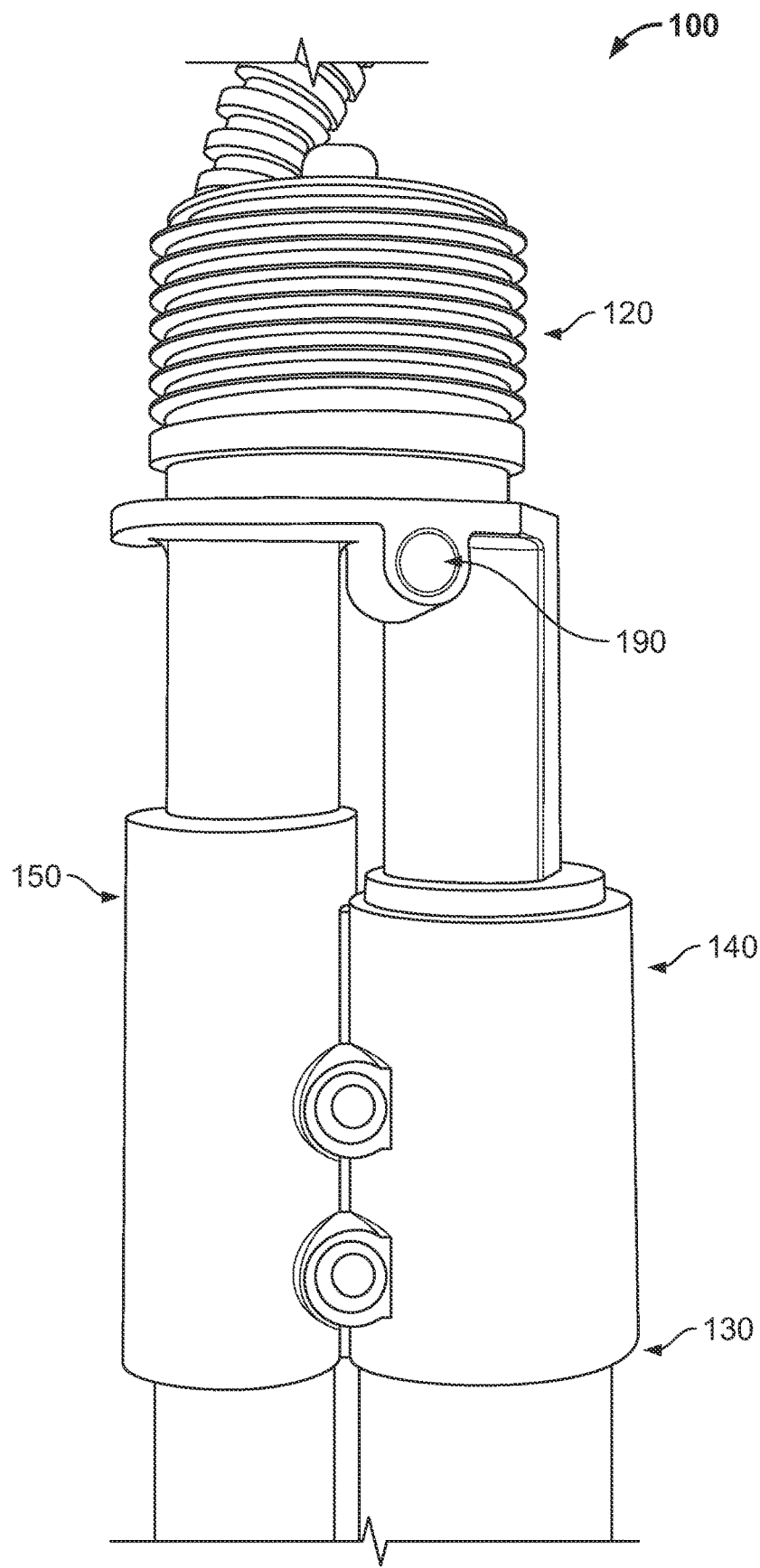

A cross-sectional view of the first end 120 and upper portion of the sensor adapter 100 is shown in FIG. 5. A cross-sectional view of the second end 130 and lower portion of the sensor adapter 100 is shown in FIG. 6. FIGS. 4A-4B also show cross-sectional views of the sensor adapter 100. FIGS. 2, 3B, 4A, and 4B show examples of the tortuous pathway 193.

In an embodiment, the first end 120 may be a free end or may be selectively attachable to the DEF reservoir or tank (or other component within the diesel or vehicular system). For example, the first end 120 may be generally cylindrical or circular and may include threading 122 on an exterior surface (e.g. 112) of the first end 120. The threaded portion 122 of the first end 120 may facilitate selective mounting in a DEF header or within the DEF reservoir or tank. For example, the DEF header, reservoir, tank, or other component within the diesel or vehicular system may include a member having interior threads and sized and shaped to selectively receive the threaded portion 122 of the first end 120 of the sensor adapter 100. An example of mating attachment of the first end 120 is shown in FIG. 5. Although threads are herein disclosed and shown in the drawings, it is noted that other mating attachments and connectors may also be used, including, but not limited to, friction fit mating components, pressure fit mating components, snap-fit mating components, adhesives, O-rings, seals, fasteners, braces, brackets, tabs, pins, latches, snaps, bayonet mounts or interlocks, sliding interlocks, magnetic interlocks, any other female to male engagement mechanisms, and the like.

In an embodiment, the second end 130 may be a free end or may be selectively attachable to the sensor, the sensor housing, or other component to form the sensor assembly. It is also noted that the second end 130 may be selectively attachable to the DEF reservoir or tank (or other component within the diesel or vehicular system). The second end 130 may be selectively attachable to its mating component through any mating attachments and connectors, including, but not limited to, threaded mating components, friction fit mating components, pressure fit mating components, snap-fit mating components, adhesives, O-rings, seals, fasteners, braces, brackets, tabs, pins, latches, snaps, bayonet mounts or interlocks, sliding interlocks, magnetic interlocks, any other female to male engagement mechanisms, and the like.

The sensor adapter 100 may further include a first member 140 and a second member 150. Each member 140, 150 may include an interior chamber 145, 155. In an embodiment, either or both the first member 140 and the second member 150 may be hollow tubular members. The first member 140 and the second member 150, and the corresponding interior chambers 145, 155 may be separated by wall 160. Wall 160 may extend between all or a portion of the interior chambers 145, 155. For example, wall 160 may end up through the first end 120 of the sensor adapter but may not extend entirely through to the second end 130 of the sensor adapter 100, compare FIGS. 4B and FIGS. 5-6 showing cross-sectional views of the first end 120 and upper portion of the sensor adapter 100 and the second end 130 and lower portion of the sensor adapter 100, respectively. In an embodiment, second end 130 may serve as an attachment portion to other sensor and housing components seen in FIG. 6. For example, in the first chamber 145, an O-ring 230 may be incorporated as shown to seal a level and/or concentration chamber. The O-ring can prevent DEF and aerated DEF from entering the level and/ or concentration chamber. While wall 160 may not extend entirely through the second end 130 of the sensor adapter 100 to physically separate interior chambers 145, 155 at the second end 130, in some embodiments, it is noted that the interior chambers 145, 155 may not be fluidly connected and may be separated and sealed apart in the second end 130 by the attachment to other sensor and housing components. In an embodiment, the second chamber 155 may be closed or sealed from fluid and house electrical components of the sensor adapter 100.

First member 140 and the interior chamber therein 145 may include a first portion 142 and a second portion 144 (portions may also be referred to as segments). In an embodiment, the first portion 142 may have a larger diameter or interior size that the second portion 144. In an embodiment, the first portion 142 having the larger diameter may be at or near the second end 130 of the sensor adapter 100 or within the second end 130 of the sensor adapter 100 and the second portion 144 having the smaller diameter may be at or near the first end 120 of the sensor adapter 100 or in the middle of the sensor adapter 100. The first portion 142 may have a first size at the first portion 142 and may taper, step, or otherwise change into a second size at the second portion 144. The point of change in size may occur at step or shoulder 146, for example. The step 146 (which may also be referred to as shoulder 146) may be seen on an exterior 112 of the housing 120 and in the interior chamber 145 (e.g. on the interior 114 of the housing) providing a change in both the exterior and the interior sizes or diameters of the first and second portions 142, 144 of the first member 140. As shown in FIGS. 4 and 5-6, step 146 may include one single step or two split steps. It is noted that other numbers of steps may also be used in regard to this step 146 and other steps herein described, e.g., step 126 and step 156. It is noted that the first 142 and second 144 portions of the first member 140 and first chamber 145 may refer to the exterior 112 or the interior 114 of the sensor adapter 100 unless context or this disclosure suggests otherwise. The resulting step or shoulder 146 may provide a stop point or mating attachment to other sensor and housing components seen in FIG. 6.

Second member 150 and the interior chamber therein 155 may include a first portion 152 and a second portion 154 (portions may also be referred to as segments). In an embodiment, the first portion 152 may have a larger diameter or interior size than the second portion 154. In an embodiment, the first portion 152 having the larger diameter may be at or near the second end 130 of the sensor adapter 100 or within the second end 130 of the sensor adapter 100 and the second portion 154 having the smaller diameter may be at or near the first end 120 of the sensor adapter 100 or in the middle of the sensor adapter 100. The first portion 152 may have a first size at the first portion 152 and may taper, step, or otherwise change into a second size at the second portion 154. The point of change in size may occur at step 156 or shoulder, for example. The step 156 (which may also be referred to as shoulder 156) may be seen on an exterior 112 of the housing 120 and in the interior chamber 155 (e.g. on the interior 114 of the housing) providing a change in both the exterior and the interior sizes or diameters of the first and second portions 152, 154 of the first member 150. It is noted that the first 152 and second 154 portions of the second member 150 and second chamber 155 may refer to the exterior 112 or the interior 114 of the sensor adapter 100 unless context or this disclosure suggests otherwise. The resulting step or shoulder 156 may provide a stop point or mating attachment to other sensor and housing components seen in FIG. 6.

In an embodiment, step 146 of the first member 140 may be at approximately the same height on the body 110 of the sensor adapter 100 as step 156 of the second member 150. In an embodiment, step 146 of the first member 140 may be located at a different height on the body 110 of the sensor adapter 100 as compared to step 156 of the second member 150. In an embodiment, step 146 of the first member 140 may be lower on the body 110 of the sensor adapter 100 as step 156 of the second member 150. In an embodiment, step 156 of the second member 150 may be higher on the body 110 of the sensor adapter 100 as step 146 of the first member 140. It is noted that the opposite configuration is also considered and disclosed.

In an embodiment, the first chamber 145 may receive fluid, e.g. DEF and sometimes entrained air (if present) from the corresponding DEF tank or reservoir where the sensor adapter 100 (and sensor assembly) may be positioned. In an embodiment, the first chamber 145 of the sensor adapter 100 may allow DEF therethrough and first chamber 145, or a portion thereof, may be fluidly connected to another component, such as the sensor housing (e.g. through the second end 130) so that the sensor may measure an aspect of the DEF (e.g. fluid level, fluid temperature, fluid concentration, etc.). The fluid may include entrained air which is undesirable if near the sensor. The first chamber 145 and vents 190, 192 may provide a tortuous path 193 to prevent air from entering into and reaching the sensor and for the fluid so that any entrained air may be removed from the fluid so that it does not affect the sensor. The first chamber 145 and fluid therein may be fluidly connected to the surrounding DEF tank or reservoir and fluidly sealed from the second chamber 155 of the sensor adapter 100 so that fluid may be selectively present in the first chamber 145 but not in the second chamber 155.

In an embodiment, the second chamber 155 may be a wiring conduit that can house electrical components or wires, e.g. wire 158 and provide an electrical connection between the sensor, e.g. at the second end 130 of the sensor adapter 100 and the rest of the vehicular system through the second chamber 155 and first end 120. The second chamber 155 and electrical components or wires therein may be fluidly sealed from the surrounding DEF tank or reservoir and from the first chamber 145 of the sensor adapter 100 so that fluid may be selectively present in the first chamber 145 but not in the second chamber 155.

It is noted that the first end 120 of the sensor adapter 100 may further include a cap 124 that closes the first and second chamber 145, 155, but that may include an aperture or channel therethrough to allow wire 158 to extend out of the first end 120. The cap 124 may be permanently or fixedly attached. The first chamber 145 may further include an additional plug 210 and O-ring 220 designed to seal DEF from exposure to atmosphere. The plug 210 and O-ring 220 can prevent debris and external fluids from entering the sensor adapter 100 from outside of the DEF tank. The plug 210 and O-ring 220 can prevent DEF inside the tank from leaking out of the DEF tank.

In an embodiment, the sensor adapter 100 may include a tortuous pathway 193. The tortuous pathway 193 may assist in separating any entrained air (if present) from the DEF and/or from entering the sensor adaptor 100 through the vents. In an example, the first chamber 145 may include a third portion 148 (which may also be referred to as a segment) and entrance 194 therebetween the second and third portions 144, 148. In an embodiment, the first portion 142 of the first chamber 145 may have a larger diameter or interior size than the third portion 148. In an embodiment, the second portion 144 of the first chamber 145 may have a larger diameter or interior size than the third portion 148. In an embodiment, both the first portion 142 and the second portion 144 of the first chamber 145 may have a larger diameter or interior size than the third portion 148. In an embodiment, the first portion 142 may have a larger diameter than the second portion 144 and the second portion 144 may have a larger diameter or interior size than the third portion 148. It is noted that the first 142, second 144, and third 148 portions of the first member 140 and first chamber 145 may refer to the exterior 112 or the interior 114 of the sensor adapter 100 unless context or this disclosure suggests otherwise.

As shown in FIG. 4A, the second portion 144 and third portion 146 may have generally the same diameter, but the entrance or point 194 between the second 144 and the third portion 148 may have the reduced diameter as described. The entrance 194 may be part of the tortuous pathway 193 as described. The reduced diameter of the entrance 194 may result from step 126 and/or shelf 195. In an embodiment, either the third portion 148, the entrance 194 between the second and third portions 144, 148, or both, have a diameter that is significantly reduced from the first and second portions 142, 144. In an example, the entrance 194 between the second and third portions 144, 148, may be less than half the size of the second portion 144. In an example, the entrance 194 between the second and third portions 144, 148 may be approximately or less than one third the size of the second portion 144. In an embodiment, the entrance 194 between the second and third portions 144, 148, may be approximately 2 mm. In an embodiment, the entrance 194 between the second and third portions 144, 148 may between approximately 0.5-4 mm, 1-3 mm, 1.5-2.5 cm, etc. The entrance 194 between the second and third portions 144, 148, may be an aperture. The entrance 194 between the second and third portions 144, 148, may be circular, but may also be oval, square or rectangular.

In an embodiment, the first portion 142 having the larger diameter may be at or near the second end 130 of the sensor adapter 100 or within the second end 130 of the sensor adapter 100, the second portion 144 having a middle diameter may be at or near the first end 120 of the sensor adapter 100 or in the middle of the sensor adapter 100, and the third portion 148 having a smaller diameter or smaller diameter entrance 194 between the second and third portions 144, 148 may be at or near the first end 120 of the sensor adapter 100 or within the first end 120 of the sensor adapter 100. The second portion 144 may have a first size at the second portion 144 and may taper, step, or otherwise change into a second size at the third portion 148 or at least at the entrance 194 between the second and third portions 144, 148, in an embodiment.

The point of change in size may occur at step or shoulder 126, for example. The step 126 (which may also be referred to as shoulder 126) may be seen on an exterior 112 of the housing 120 as part of the first end 120 or as between the first end 120 and the first and second members 140, 150. The step 126 may be seen in the interior chamber 145 (e.g. on the interior 114 of the housing), see FIGS. 3B and 4A for example. The step 126 may provide a change in both the exterior and the interior sizes or diameters of the second and third portions 144, 148 (or entrance 194 therebetween the second and third portions 144, 148) of the first member 140 and/or first chamber 145. Shelf 195 may also provide a change in the interior sizes or diameters of the second and third portions 144, 148 (or entrance 194 therebetween the second and third portions 144, 148) of the first member 140 and/or first chamber 145.

In an embodiment, step 126 of the first member 140 may be closer to the first end 120 of the sensor adaptor 100 than step 146 which may be closer to the second end 130 of the sensor adapter 100. In an embodiment, step 126 of the first member 140 may be located at a different height on the body 110 of the sensor adapter 100 as compared to step 156 of the second member 150. In an embodiment, step 126 of the first member 140 may be higher on the body 110 of the sensor adapter 100 than step 156 of the second member 150 (e.g. closer to the first end 120 than the second end 130). It is noted that the opposite configuration is also considered and disclosed.

In an embodiment, fluid, such as DEF, may enter into the sensor adapter 100 through the second end 130 of the sensor adaptor 100, or through sensor and housing components that are thereto attached to the second end 130. In an embodiment, fluid, such as DEF, may enter into the sensor adapter 100 through vents 190, 192 from the DEF reservoir or tank directly (e.g. from sloshing). Air that may be present in the fluid may enter and rise through the first, second, and third portions 142, 144, 148 of the first chamber 145 respectively and either remain accumulated at the top of the third portion 148 or may vent out through the vents 190, 192. The various reducing diameters of or between the first, second, and third portions 142, 144, 148 of the first chamber 145 respectively may assist in separating the air bubbles from the fluid and directing the separated air into the third portion 148 and out of the sensor adaptor 100. The structure of the vents 190, 192, the connection into the third portion 148 from the vents 190, 192, and the connection from the third portion 148 into the second portion 144 at point 194 (which may be referred to as an entrance) may also assist in separating the air bubbles from the fluid, etc., and may further prevent air from entering the vents 190, 192, entering into the third portion 149 of the first chamber 145, and entering into the second portion 144 or further toward the sensors.

Fluid, such as DEF may enter into the vents, inlet, or the sensor adaptor 100 generally to reach the sensors and to indicate, for example, and aspect of the fluid, such as fluid level, fluid temperature, fluid concentration (e.g., urea in water), etc. Various provisions may be made for sensing DEF characteristics. For example, a fluid level sensing waveguide, such as a first member 140 and first chamber 145, may be provided. Providing such a waveguide may improve accuracy because the fluid inside the fluid level sensing waveguide may vary less than the DEF fluid tank in general, which may experience sloshing as a vehicle is in motion.

As described herein, the fluid may include entrained air that, if it reaches the sensor, could affect sensor readings, precision, and functionality. The sensor adapter 100 may include a tortuous pathway 193 into the vents 190, 192 and through the third, second, and first portions 148, 144, 142 of the first chamber 145 respectively to separate any entrained air (if present) from the DEF and/or to prevent the air and entrained air/fluid, from entering the body of the sensor adaptor 100 and reaching the sensor. The sensor adapter 100 may include a tortuous pathway 193 through the first, second, and third portions 142, 144, 148 of the first chamber 145 respectively and out of the vents 190, 192 to separate any entrained air (if present) from the DEF and/or to prevent the air and entrained air/fluid, from entering the body of the sensor adaptor 100 and reaching the sensor.

For example, the tortuous pathway 193 may include the stepped chambers (e.g., steps 146, 126) and varying diameters between the first 142, second 144, and/or third 148 portions as described. For example, the tortuous pathway 193 may include the reduced diameter entrance 194 between the second portion 144 and the third portion 148 as described. The tortuous pathway 193 may further include vents 190, 192.

Figure 2:
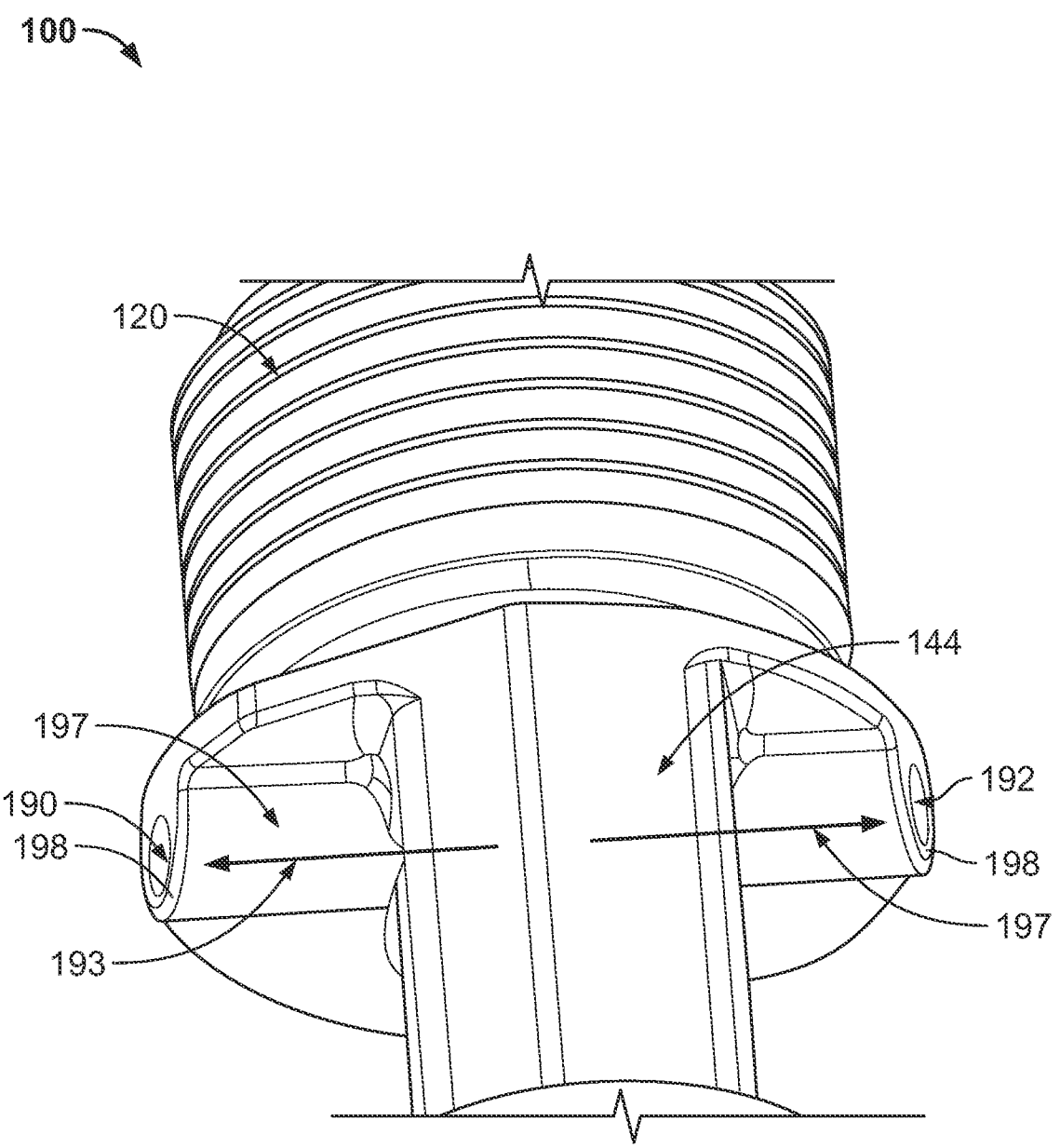
FIG. 2 shows a bottom perspective view of an embodiment of a DEF sensor adapter in accordance with various aspects disclosed herein.
Figure 3A:
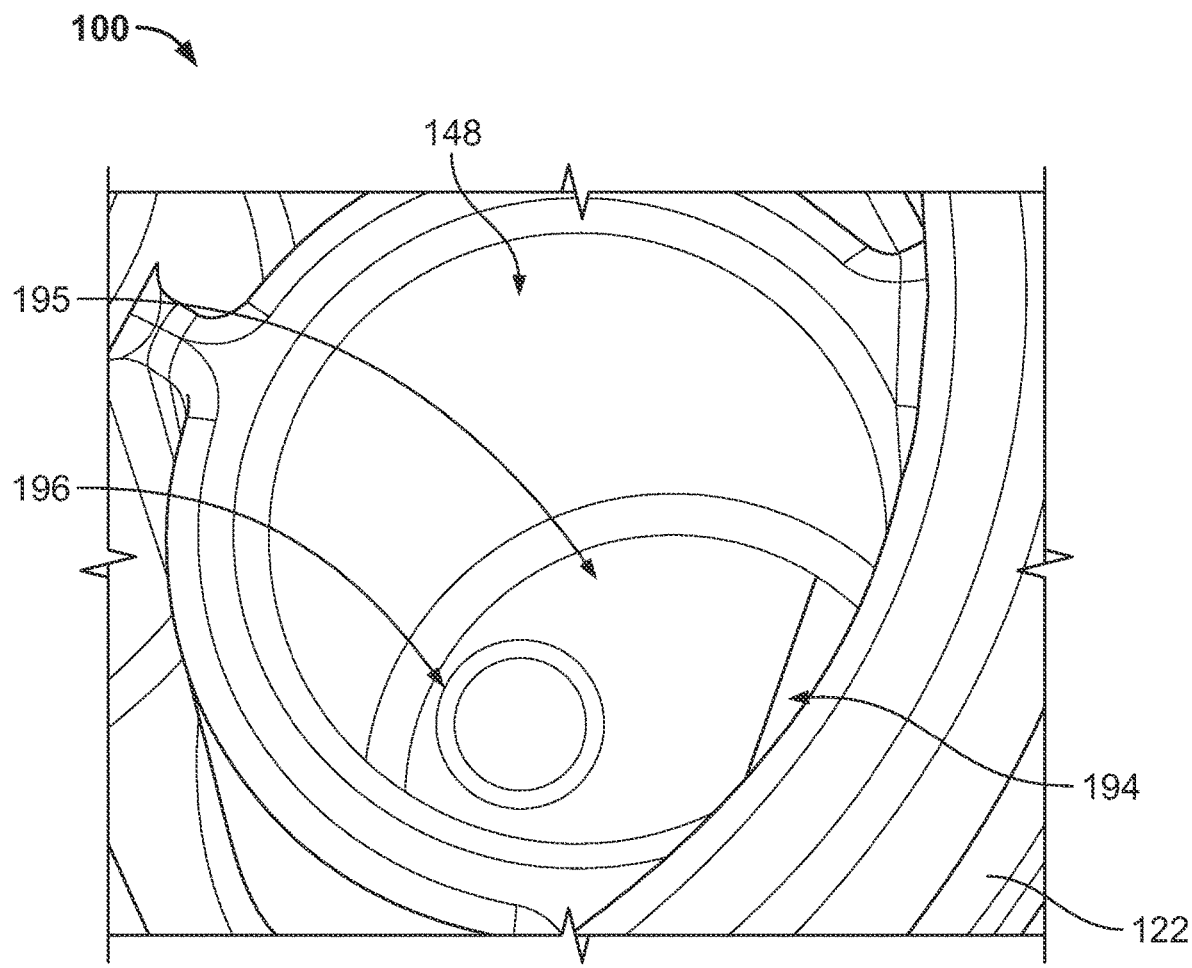
FIG. 3A shows a top perspective view of an embodiment of a DEF sensor adapter in accordance with various aspects disclosed herein.
Figure 3B:
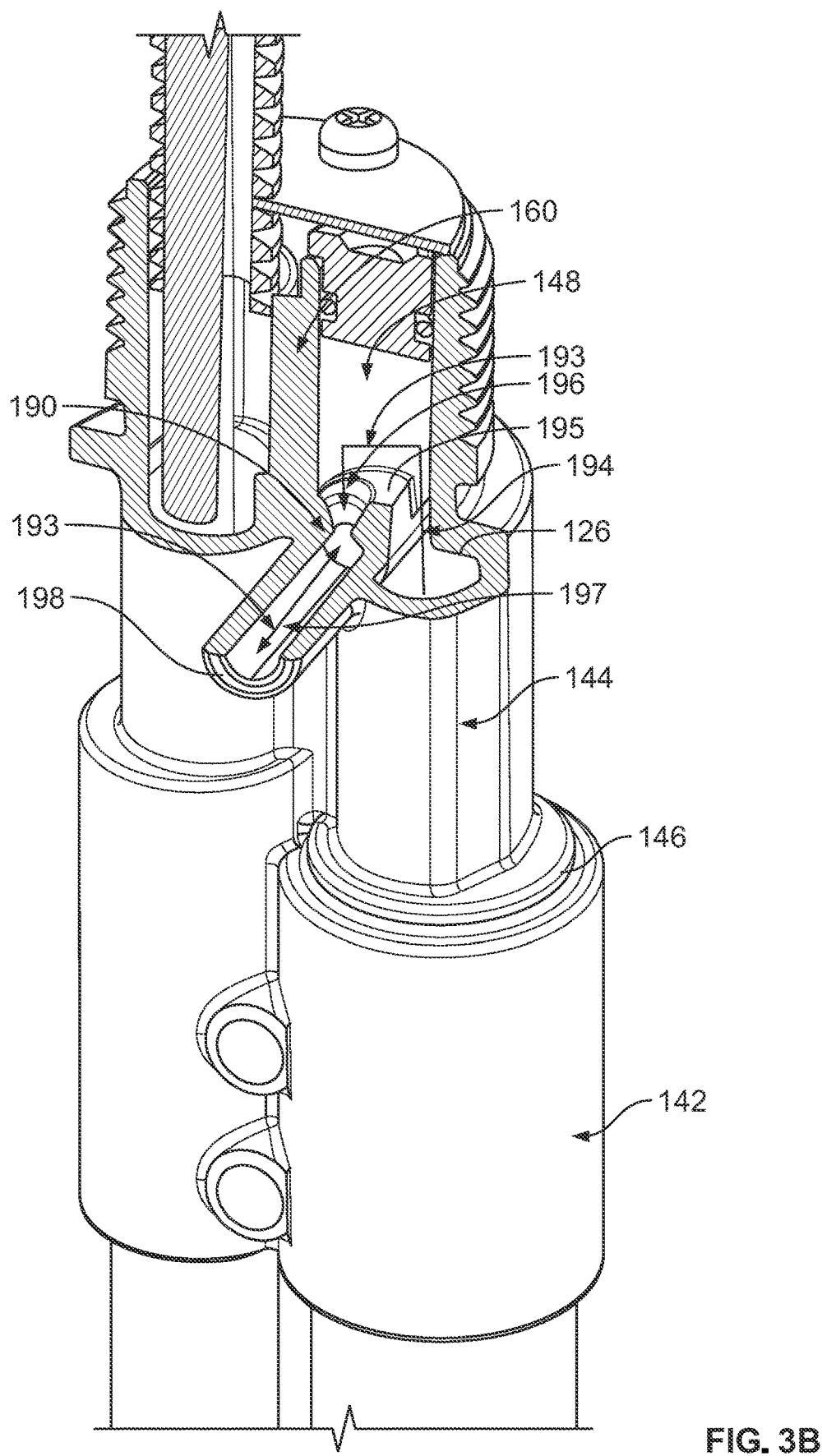
FIG. 3B shows a partial cross-sectional view of a perspective view of an embodiment of a DEF sensor adapter in accordance with various aspects disclosed herein.

The sensor adaptor 100 may include one or more vents 190, 192. It is noted that the sensor adapter 100 may include 1, 2, 3, 4, 5, 6, 7, 8, 9, 10, or more, ranges therebetween, etc., vents. The vents 190, 192 and vent pathway may combine into the first chamber 145 or the first chamber 145 may branch into as many separate vents as desired. As shown in FIG. 2, for example, the first chamber 145 may branch into two vents 190, 192 that are positioned on opposite sides of the sensor adapter 100. In an embodiment, the two vents 190, 192 may be positioned 180° from one another, see FIG. 2, for example. It is noted that other geometries may also be used without departing from the disclosure. In an embodiment, the two vents 190, 192 may be at relatively the same horizontal level of the first chamber 145, see FIG. 2, for example. The vents 190, 192 and vent pathway prior to entering the third portion 148 may include a substantially horizontal portion 197.

In an embodiment, vents 190, 192 may be positioned on a bottom surface or lower portion of the third portion 148. In an embodiment, the bottom surface or lower portion of the third portion 148 may include a shelf 195. The shelf may separate the second portion 144 and the third portion 148 and may contribute to the reduced diameter entrance 194 to the third portion 148 (e.g., along with step 126). Vents 190, 192 may include an inlet 196. The inlet 196 may be located on or near shelf 195 and may correspond to one end (or first end) of the vents 190, 192. The shelf 195 may form or lead into inlet 196. The shelf 195 may be positioned in a general middle of the sensor adapter 100 or at or near wall 160. The inlet 196 may be positioned in a general middle of the sensor adapter 100 or at or near wall 160. The inlet 196 may be located adjacent, near, or in proximity to the entrance 194. In an embodiment, the inlet 196 and entrance 194 may be at relatively the same horizontal level of the first chamber 145, see FIGS. 3B and FIG. 4A, for example. Although in proximity to each other, fluid flow between the entrance 194 and the inlet 196 may have or require a 180° turn, see tortuous pathway 193 shown in FIGS. 3B and FIG. 4A, for example. It is noted that other geometries may also be used without departing from the disclosure.

The inlet 196 may lead to the substantially horizontal portions 197. It is noted that each vent 190, 192 may include its own horizontal portion 197 from inlet 196, see FIG. 2, for example. In embodiment, a sensor adapter 100 with two vents 190, 192 may include two substantially horizontal portions 197. Vents 190, 192 may include an outlet 198. The outlet 198 may correspond to the other (or second) end of the vents 190, 192. The substantially horizontal portions 197 may lead to an outlet 198. In embodiment, a sensor adapter 100 with two vents 190, 192 and two substantially horizontal portions 197 may further include two outlets 198, see FIG. 2. In an embodiment, the transition from the inlet 196 to the substantially horizontal portions 197 may have or require a 90° turn, see tortuous pathway 193 shown in FIG. 3B, for example. It is noted that other geometries may also be used without departing from the disclosure. In an embodiment, the two substantially horizontal portions 197 may extend across a majority of a width of the sensor adapter 100. In an embodiment, each substantially horizontal portions 197 may extend across at least half of the width of the sensor adapter 100.

In an embodiment, the substantially horizontal portion 197 may generally prevent fluid and air in the horizontal portion from entering into the third portion 148 of the first chamber 145, while still allowing air to vent out of the vents 190, 192 from the third portion 148.

In an embodiment, the third portion 148 of the first chamber 145 may be positioned above the substantially horizontal portion 197 of the vents 190, 192 serve to trap air that enters through the vents or that is separated/rises from the first and second portions 142, 144 of the first chamber 145

In an embodiment, the step 126 and small entrance 194 between the second and third portions 144, 148 may assist in separating entrained air from fluid within the second portion 144 (e.g. where the air rises into the third portion 148) and may assist in prevent air from entering back down into the second portion 144 from the third portion 148.

In an embodiment, the sensor adapter 100 may be provided as a one-piece design or may be formed by one or more components that are selectively assembled. In an embodiment, the sensor adapter 100 may be monolithically formed. In these monolithic embodiments, the sensor adapter 100 may be formed in any appropriate matter, such as through 3-D printing, extrusion molding, injection molding, other molding, casting, or any manufacturing processes.

In an embodiment, the sensor adapter 100 or components thereof may be made of any desired material, including, without limitation, metal, plastics, rubbers, composites, and the like. The sensor adapter 100 may be made of the same material, or different components or portions of the sensor adapter 100 may be made from different materials.

In an embodiment, sensor adapter 100 may adapter a vent path design to isolate level and/or concentration chamber with vent at the same time locating vent at the optimum height. In an embodiment, sensor adapter 100 may address leakage thought clearances between extruded tube and upper adapter by installing an O-ring seal.

Generally, the described sensor adapter 100 provides improved performance compared to conventional systems. The sensor adapter 100 can prevent or minimize aerated DEF from entering into the vents 190, 192 and into the interior chamber 145. For example, to enter the interior chamber 145 (and first and second segments 144, 142, for example), aerated DEF would have to enter the outlet 198 of the vents 190, 192, travel through the horizontal portion 197, travel upwards through the inlet 196 and into the third segment 148, over shelf 195, and through the smaller entrance 194 (each of which comprise the tortuous pathway 193). Each of these aspects (and others) of the tortuous pathway 193, individually and in combination, can make it difficult or unlikely for aerated DEF to enter into the sensor adapter 100 and components thereof. Each of these aspects (and others) of the tortuous pathway 193, individually and in combination, can also allow the air to vent out of the interior chamber 145, e.g., through inlet 196, horizontal portion 197, and outlet 198. The sensor adapter 100 and tortuous pathway 193 can also prevent fluid within the interior chamber 145 from becoming aerated with air that may be within the sensor adapter 100 (e.g., in third segment 148), e.g., based on the varying diameters, stepped structures, small entrance points, 180° turns, and the like.

In one example, the tortuous vent pathway 193 may comprise a pathway that requires a first turn to pass (the turn may be a left turn or right turn or a combination of both). The tortuous pathway 193 may then comprise another turn to pass (the turn may be a left turn, a right turn or a combination of both). The tortuous pathway 193 may also be at different elevations meaning the turns may be elevation turns or may be at the same elevation. The tortuous pathway 193 may comprise any number of turns, e.g., 1, 2, 3, 4, 5, 6 or more. The present disclosure is not limited by the number of turns. Moreover, the tortuous pathway 193 may comprise any number of left turns (e.g., 1, 2, 3, 4, 5, 6 or more) and may comprise any number of right turns (e.g., 1, 2, 3, 4, 5, 6 or more). Further, the tortuous pathway 193 turns may be of any appropriate angle, e.g., 20-110 degrees, 110-160 degrees, 190-270 degrees.

Overall, sensor adapter 100 can assist in preventing, minimizing, and/or eliminating air, entrained air, and aerated DEF in the system and can allow for more accurate measurements for concentration, fluid level, and the like. In an example, the sensor adapter 100 showed improved performance using liquid slosh testing performed at varying frequencies. Sensor errors can be caused from aerated DEF entering through sensor vent hole. The sensor adapter 100 may provide a modified upper sensor adapter and may isolate level sensor and concentration chamber. The sensor adapter 100 can prevent or minimize sensor errors.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A fluid sensor adapter for fluid aeration mitigation, comprising:
 a first chamber comprising an inlet configured to receive diesel exhaust fluid;
 wherein the first chamber comprises a first segment at a proximal end of the fluid sensor adapter, a third segment at a distal end of the sensor adapter and a second segment between the first and the third segments;
 wherein a diameter of the second segment is less than a diameter of the first segment, and wherein an entrance to the third segment from the second segment is more narrow than the diameter of the second segment, wherein the diameter of the second segment and a diameter of the third segment are approximately equal; and
 wherein the decrease in diameter from the first segment to the second segment and the narrowing of the entrance to the third segment from the second segment comprise a tortuous vent pathway configured to prevent air in a fluid from reaching a sensor.

2. The fluid sensor adapter of claim 1, wherein the first segment includes a shoulder that facilitates the decrease in diameter from the first segment to the second segment.

3. The fluid sensor adapter of claim 1, wherein the second segment includes a shoulder that facilitates the narrowing of the entrance to the third segment from the second segment.

4. The fluid sensor adapter of claim 1, wherein the decreases in diameter from the first segment to the second segment and the narrowing of the entrance to the third segment from the second segment occur on an interior and an exterior of the fluid sensor adapter.

5. The fluid sensor adapter of claim 1 further including at least one vent in the third segment.

6. The fluid sensor adapter of claim 5, wherein the at least one vent has a substantially horizontal portion.

7. The fluid sensor adapter of claim 1, wherein the first segment includes an O-ring.

8. The fluid sensor adapter of claim 1, wherein the third segment includes a plug and O-ring.

9. The fluid sensor adapter of claim 1 further including a second chamber, wherein the second chamber is positioned adjacent the first chamber but is fluidly isolated from the first chamber.

10. A fluid sensor adapter for fluid aeration mitigation, comprising:
   a first chamber comprising an inlet configured to receive diesel exhaust fluid;
   wherein the first chamber a first segment at a proximal end of the fluid sensor adapter, a third segment at a distal end of the sensor adapter and a second segment between the first and the third segments;
   wherein a diameter of the second segment is less than a diameter of the first segment, and wherein an entrance to the third segment from the second segment is more narrow than the diameter of the second segment; and
   wherein the decrease in diameter from the first segment to the second segment and the narrowing of the entrance to the third segment from the second segment comprise a tortuous vent pathway configured to prevent air in a fluid from reaching a sensor, wherein the third segment comprises a plug and O-ring.

11. The fluid sensor adapter of claim 10, wherein the diameter of the second segment and a diameter of the third segment are approximately equal.

12. The fluid sensor adapter of claim 11, wherein the first segment includes a shoulder that facilitates the decrease in diameter from the first segment to the second segment.

13. The fluid sensor adapter of claim 12, wherein the second segment includes a shoulder that facilitates the narrowing of the entrance to the third segment from the second segment.

14. The fluid sensor adapter of claim 13 further comprising at least one vent in the third segment.

15. The fluid sensor adapter of claim 14, wherein the at least one vent has a substantially horizontal portion.

16. The fluid sensor adapter of claim 15 further comprising a second chamber, wherein the second chamber is positioned adjacent the first chamber but is fluidly isolated from the first chamber.

* * * * *